(12) United States Patent
Reeves et al.

(10) Patent No.: US 8,949,597 B1
(45) Date of Patent: Feb. 3, 2015

(54) MANAGING CERTIFICATES ON A MOBILE DEVICE

(75) Inventors: Raymond Emilio Reeves, Olathe, KS (US); Ryan Alan Wick, Apollo Beach, FL (US); Jeff H. Bryan, Olathe, KS (US); John Marvin Jones, III, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 641 days.

(21) Appl. No.: 12/644,233

(22) Filed: Dec. 22, 2009

(51) Int. Cl.
*H04W 12/00* (2009.01)
*H04L 9/32* (2006.01)
*G06F 21/33* (2013.01)
*H04W 12/04* (2009.01)

(52) U.S. Cl.
CPC ........... *H04W 12/04* (2013.01); *H04L 2209/80* (2013.01)
USPC .................. 713/156; 713/155; 726/3; 726/4; 726/5; 726/6; 455/422.1

(58) Field of Classification Search
None
See application file for complete search history.

(56) References Cited

U.S. PATENT DOCUMENTS

| 6,112,304 | A  | * | 8/2000 | Clawson ........................ 713/156 |
| 2005/0154795 | A1 | * | 7/2005 | Kuz et al. ...................... 709/227 |
| 2006/0059346 | A1 | * | 3/2006 | Sherman et al. .............. 713/175 |
| 2006/0143700 | A1 | * | 6/2006 | Herrmann ........................ 726/14 |
| 2006/0179299 | A1 | * | 8/2006 | Tanimoto et al. ............. 713/158 |
| 2007/0245401 | A1 | * | 10/2007 | Brabson et al. ................... 726/1 |
| 2008/0133415 | A1 | * | 6/2008 | Ginter et al. ..................... 705/50 |

* cited by examiner

*Primary Examiner* — Alexander Lagor

(57) ABSTRACT

A system or method of remotely managing security certificates on a mobile device is provided. Certificates on a mobile device may be added to, deleted from, or updated by a server that manages certificates on one or more mobile devices. The server may retrieve new certificates from a certificate authority and push the certificate to the mobile device where it is stored for subsequent use. The management of security certificates on a mobile device may be governed by one or more certificate-management rules that are enforced by the remote server and/or the mobile device.

17 Claims, 5 Drawing Sheets

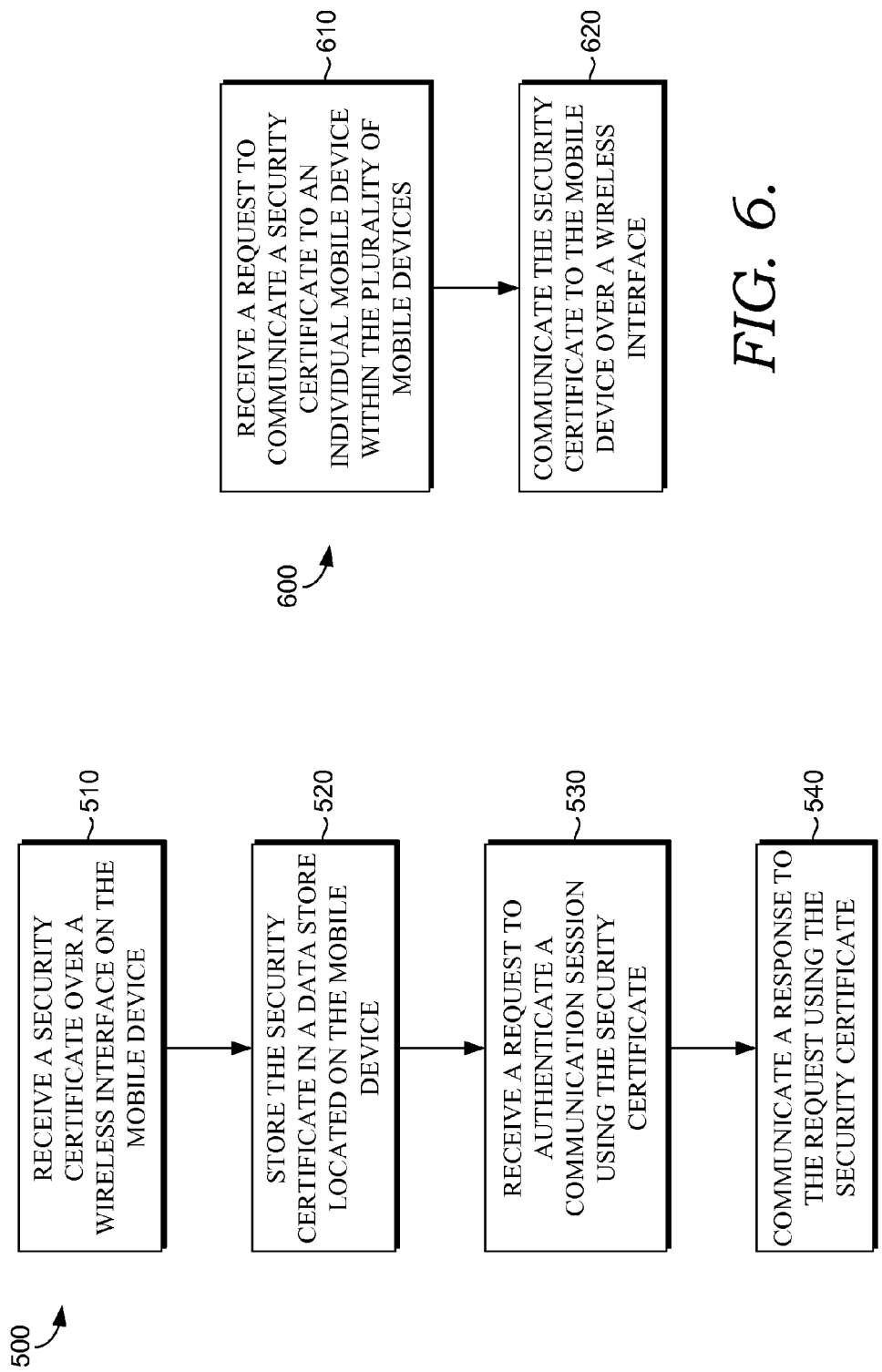

US 8,949,597 B1

MANAGING CERTIFICATES ON A MOBILE DEVICE

SUMMARY

Embodiments of the invention are defined by the claims below, not this summary. A high-level overview of various aspects of embodiments of the invention are provided here for that reason, to provide an overview of the disclosure and to introduce a selection of concepts that are further described below in the Detailed-Description section. This Summary is not intended to identify key features or essential features of the claimed subject matter, nor is it intended to be used as an aid in isolation to determine the scope of the claimed subject matter.

In a first illustrative embodiment, a method for remotely managing security certificates on a mobile device is provided. The method includes receiving, at the mobile device, a security certificate. The security certificate is received over a wireless interface on the mobile device. The method also includes storing the security certificate in a data store located on the mobile device and receiving a request to authenticate a communication session using the security certificate. The method also includes communicating a response to the request using the security certificate.

In another illustrative embodiment, one or more computer-readable media having computer-executable instructions embodied thereon that when executed by a computing device perform a method of managing security certificates on a plurality of mobile devices are provided. The method includes receiving a request to communicate a security certificate to an individual mobile device within the plurality of mobile devices. The security certificate is not presently stored on the individual mobile device. The method also includes communicating the security certificate to the individual mobile device over a wireless interface.

In a third illustrative embodiment, one or more computer-readable media having computer-executable instructions embodied thereon that when executed by a computing device perform a method of managing security certificates on a mobile device are provided. The method includes communicating, from the mobile device, a request to initiate a communication session with a computing device. The method also includes receiving a response from the computing device identifying a security certificate that is required to establish the communication session with the computing device. The method includes requesting the security certificate from a certificate-distribution server. The method also includes receiving the security certificate over a wireless interface on the mobile device and storing the security certificate in a data store on the mobile device.

BRIEF DESCRIPTION OF THE SEVERAL VIEWS OF THE DRAWINGS

Illustrative embodiments of the present invention are described in detail below with reference to the included drawing figures, wherein:

FIG. 5 is a flow chart illustrating a method for managing security certificates on a mobile device, in accordance with an embodiment of the present invention;

FIG. 6 is a flow chart illustrating a method of remotely managing security certificates on a plurality of mobile devices, in accordance with an embodiment of the present invention.

DETAILED DESCRIPTION

Figure 1:
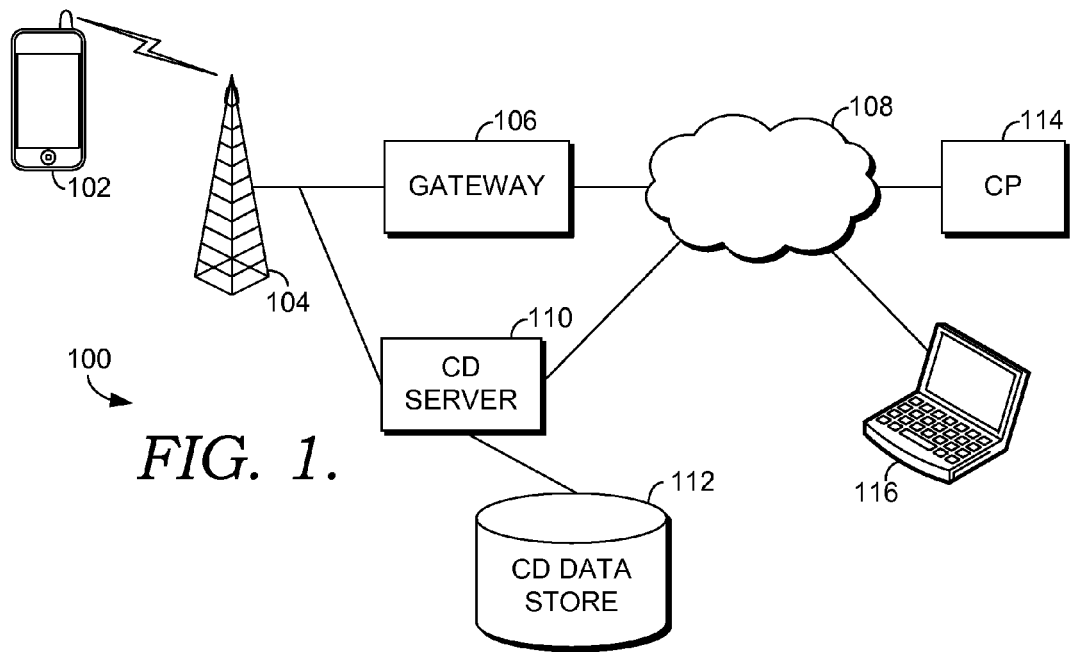
FIG. 1 is a diagram showing an illustrative operating environment suitable for practicing embodiments of the present invention.

Embodiments of the present invention relate generally to remotely managing security certificates on a mobile device. In one embodiment, the security certificates on a mobile device are managed by a certificate-distribution server that connects to the mobile device wirelessly. The certificate-distribution server may add, remove, or update certificates that are installed on the mobile device. The certificate-distribution server may receive instructions to update the certificates on a mobile device from the mobile device, from a content provider that wishes to use a certificate to ensure a secure communication with the mobile device, or by monitoring aspects, such as the expiration dates, of certificates on the mobile device. A user of the mobile device may establish certificate-management rules that govern the remote management of certificates.

Security certificates are used to encrypt network communications occurring between two endpoints and to verify the identity of one or more endpoints. Examples of applications that use security certificates to encrypt their communications include web browsers, electronic mail applications, Internet faxing applications, instant messaging applications, and voice-over-IP applications. Various cryptographic protocols may be used with the security certificates to encrypt the communications. Examples of cryptographic protocols include secure socket layer ("SSL") and transport layer security ("TLS"). The cryptographic protocols may be applied at the transport layer. For example, they may encapsulate data transported according to the Hypertext Transfer Protocol ("HTTP"), Hypertext Transfer Protocol Secure ("HTTPS"), File Transfer Protocol ("FTP"), Simple Mail Transfer Protocol ("SMTP"), Network News Transfer Protocol ("NNTP"), or Extensible Messaging and Presence Protocol ("XMPP") and other protocols.

An individual certificate may be provided by a certificate authority, such as VeriSign. An individual certificate may contain identification information as well as encryption information. The certificate may include a serial number used to uniquely identify the certificate. The certificate also may include a subject to identify the person or entity associated with the certificate. The certificate may include a signature algorithm, which is the algorithm used to create the signature. The certificate may also include the issuer, which is the entity that verified the information and issued the certificate. The issuer may be the certificate authority. The certificate may also include a valid-from date and an expiration date. The certificate may also include a key usage. The key usage may be encryption, verification, or some other purpose. The certificate may also include the public key to encrypt a message to the named subject or to verify a signature for the named subject. The contents may also include a thumbprint algorithm that is used to hash the certificate and a thumbprint which is the hash itself to ensure that the certificate has not been tampered with. In one embodiment, both endpoints of a communication must have the certificate preinstalled in order to establish a communication session. In other embodiments, the certificate needs to be preinstalled on only one endpoint to a communication session.

Throughout the description of embodiments of the present invention, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of embodiments of the present invention.

API Application Interface
CDMA Code Division Multiple Access
CD Certificate Distribution
DVD Digital Versatile Discs
EEPROM Electrically Erasable Programmable Read Only Memory
GSM Global System for Mobiles
LAN Local Access Network
PDA Personal Digital Assistant
PDSN Packet Data Serving Node/Home Agent
RAM Random Access Memory
ROM Read Only Memory
SMS Short Messaging Service
SMSC Short Messaging Service Center
SIP Session Initiation Protocol
TDMA Time Division Multiple Access Embodiments of the present invention may be embodied as, among other things: a method, system, or computer-readable media with computer-executable instructions embodied thereon. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs ("DVD"), holographic media or other optical disc storage, magnetic cassettes, magnetic tape, magnetic disk storage, and other magnetic storage devices. These technologies can store data momentarily, temporarily, or permanently.

Embodiments of the present invention may be practiced in a communications network providing service to devices communicatively coupled to the communications network. An illustrative operating environment 100 that contains a few of the components within such a communications network is shown in FIG. 1. Illustrative operating environment 100 includes mobile device 102, a base station 104, a gateway 106, a network 108, a certificate-distribution ("CD") server 110, a CD data store 112, a content provider's server 114, and a computing device 116. The components shown in FIG. 1 are a few of the components that embodiments of the invention may interact with during operation. The components shown in FIG. 1 are described in brief and with an emphasis on function for the sake of simplicity. The components within FIG. 1 are communicatively coupled to each other in a manner appropriate for carrying out their respective function within the illustrative operating environment 100. Embodiments of the present invention are not limited by the communication protocols or formats used to facilitate communications between components; those mentioned are for the sake of enablement and are not meant to be limiting.

Mobile device 102 is depicted as a wireless communications device communicating over an air interface with base station 104. Mobile device 102 is a wireless terminal that is adapted to receive communications and media over the wireless networks included in illustrative operating environment 100. Some lower-level details of mobile device 102 are not shown so as to not obscure embodiments of the present invention. For example, mobile device 102 may include a bus that directly or indirectly couples the following devices: memory; one or more processors; one or more presentation components such as a display or speaker; input/output (I/O) ports; I/O components; and a power supply such as a battery. Mobile device 102 may communicate via wireless protocols, such as code division multiple access ("CDMA"), global system for mobiles ("GSM"), or time division multiple access ("TDMA"), as well as others, to communicate with base station 104.

Mobile device 102 may take on any of a variety of forms. By way of example, mobile device 102 may be a mobile telephone, smart phone, laptop computing device, desktop computing device, server, personal digital assistant ("PDA") or any combination of these or other devices. Mobile device 102 is capable of accessing content over the Internet. Examples of content that may be received include text messages, multimedia messages, emails, calendar updates, web pages, videos, pictures, and task reminders. The mobile device 102 may be associated with a user. The user is the person submitting instructions and interacting with the mobile device 102. The illustrative operating environment 100 may have any number of mobile devices. Only one mobile device is shown for the sake of simplicity.

Base station 104 is a fixed station used for communicating with mobile device 102. Standard air-interface protocols, such as code division multiple access ("CDMA"), global system for mobiles ("GSM"), or time division multiple access ("TDMA"), as well as others, may be used by base station 104 to communicate with mobile devices. Other network communications interface arrangements are also possible. A base station controller (not shown) is responsible for handling traffic and signaling with mobile device 102. Only one base station 104 is shown, and without its many components, for the sake of clarity. Mobile device 102 could be in simultaneous communication with multiple base stations. The base station 104 and related components may be described as a radio-access network. A radio-access network may be one part of a larger wireless telecommunications network.

Gateway 106 provides a boundary between radio communication functions embodied in one or more radio-access systems that form the access-facing portion of illustrative operating environment 100 and the standard internet protocol ("IP") communication functions (including Mobile IP) embodied in the public-network facing portion (e.g., network 108) of illustrative operating environment 100. Access gateway 106 might be, for example, an ASN-GW, a PDSN, an SGSN/GGSN, and the like. The gateway 106 includes a computing device that may include a CPU, short-term memory, long-term memory, and one or more network interfaces. The network interfaces are used to communicate data between the network 108 and devices, such as mobile device 102, connected to the access-facing portion of illustrative operating environment 100. A network interface to the WAN or LAN could be wired, wireless, or both.

Network 108 may include one or more mobile networks, one or more packet-based networks, including the Internet, and the public-switched telephone network ("PSTN"). The various components within network 108 may be owned and/or operated by multiple entities, commercial or otherwise. Network 108 is configured to transmit a variety of communication formats including phone calls, emails, text messaging, faxes, instant messaging, pages, voice mails, photographs, audio files, web pages, videos, movies, TV shows, calendar reminders, task reminders, and other files containing communicative content.

The CD server 110 is responsible for adding and removing security certificates from mobile devices, such as mobile device 102. In one embodiment, the CD server 110 is associated with a telecommunications entity providing the radio-access network with which the mobile device 102 is affiliated. Thus, the CD server 110 may manage security certificates for mobile devices authorized to communicatively couple with a particular radio-access network.

There are multiple ways in which the CD server 110 may initiate changes to the security certificates installed on mobile device 102. For example, the CD server 110 may track the expiration date of security certificates initially installed on mobile device 102. The security certificates may initially be installed by the manufacturer of the mobile device 102 or at some other point prior to the mobile device 102 initially being given to a user. When the CD server 110 becomes aware of an expired security certificate, the CD server 110 may contact a certificate authority associated with the expired security certificate to see if a replacement security certificate has been made available. A change may be initiated when a certificate authority sends a notification to the CD server 110 indicating that a particular security certificate, which the CD server 110 determines is installed on the mobile device 102, has been compromised. In such a case, the CD server 110 may wish to delete the certificate from the mobile device 102 or provide a warning to the user of the mobile device 102 indicating that the certificate has been compromised. Additionally, a change may be initiated when the mobile device 102 or a content provider's server 114 requests installation of a particular security certificate on the mobile device 102.

The CD server's 110 certificate-management activities may conform to certificate-management rules that are customized by a user to satisfy their security preferences. The certificate-management rules may specify whether or not a certificate may be auto-installed without user confirmation or notification on the mobile device 102. The rules may also specify a level of confirmation required from the user of the mobile device 102 prior to installation of a new security certificate. The rules may specify a particular certificate authority from which new certificates may be received. Similarly, the user may choose to forbid the installation of security certificates from one or more certificate authorities. The rules allow the user to specify which applications on the mobile device 102 may utilize certain certificates. For example, a proprietary application installed on the mobile devices provided by an entity may be given access to only a small number of certificates. Other applications may be denied use of these particular certificates to help ensure the security of communications occurring between the proprietary application and a server associated with the entity that developed the proprietary application or is using the proprietary application. A user with multiple devices may specify different security settings for different devices. This list of rules is not meant to be exhaustive; other rules to fine-tune the management of security certificates to the user's liking are possible.

The CD server 110 may store new certificates that it receives in CD data store 112. Additional information about the status of active security certificates may be tracked and stored on CD data store 112. In addition, the status of certificates on each mobile device in a radio-access network associated with the CD server 110 may be tracked in CD data store 112.

The content provider's server 114 provides content over network 108 to mobile device 102 and other computing devices communicatively coupled to the network 108. The content provider's server 114 may require a client device to provide a security certificate before access to content is granted. The content provider's server 114 includes a computing device that may include a CPU, short-term memory, long-term memory, and one or more network interfaces. The network interface is used to connect to a LAN, WAN (including the Internet), or other variety of communications networks. The network interface to the WAN or LAN could be wired, wireless, or both. In one embodiment, content provider's server 114 facilitates transmission of media content (e.g., movies, web pages, videos, MP3s, etc.) to mobile device 102. In addition to receiving and sharing media content, the content provider's server 114 may also host web pages that are transmitted to a requesting device. The content provider may be a bank, brokerage, e-commerce site, or other entity that wishes to secure communications between the content provider's server 114 and client devices.

The computing device 116 allows a user to access content on other computing devices over network 108. The computing device 116 may be used by a user to access the CD server 110 to view and change settings associated with the management of security certificates. The computing device 116 may include a bus that directly or indirectly couples the following devices: memory; one or more processors; one or more presentation components such as a display or speaker; input/output (I/O) ports; I/O components; and a power supply such as a battery. The computing device 116 includes a network interface that allows the computing device 116 to receive and send communications over network 108. The computing device 116 includes, or is coupled to, a display device. The computing device 116 may take the form of a desktop computer, laptop computer, PDA, smart phone, and/or other similar device.

Figure 2:
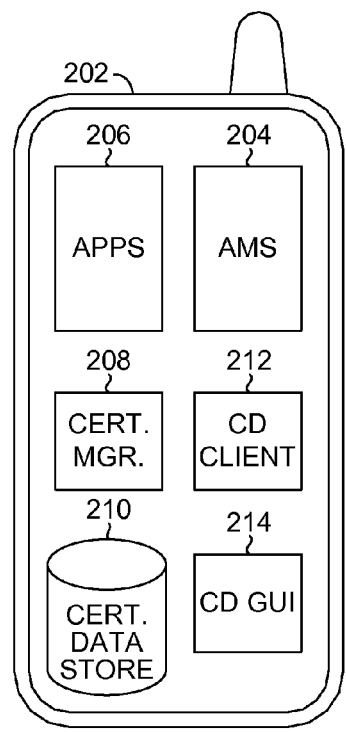
FIG. 2 is a diagram showing components of a mobile device that may be used during management and use of security certificates, in accordance with an embodiment of the present invention.

Turning now to FIG. 2, components of a mobile device 202 that may be used during management and use of security certificates are shown, in accordance with an embodiment of the present invention. The mobile device 202 may be similar to the mobile device 102 described previously with reference to FIG. 1. The mobile device 202 includes an application management system ("AMS") 204, a group of applications 206, a certificate manager 208, a certificate data store 210, a certificate-distribution ("CD") client 212, and a certificate-distribution ("CD") interface 214.

The application management system 204 facilitates execution of computer applications on the mobile device 202. For example, the mobile device 202 may be able to execute JAVA applications that perform various functions. An application may access various capabilities of a mobile device, such as GPS location capabilities and contact information capabilities. Similarly, an application may request use of a security certificate. Access to these capabilities and certificates may be managed by the AMS 204. The AMS 204 may check a policy file before allowing an application to execute code that would access Application Interfaces ("APIs") associated with certain capabilities on the mobile device 202. Because requests for certificates may go through the AMS 204, the AMS 204 may be aware of the absence of a requested certificate. In one embodiment, the AMS 204 may instruct the CD client 212 to request the certificate from a CD server.

The group of apps 206 represents applications that are available for execution on the mobile device 202. The applications may be Java or other types of applications. The applications may initiate a communication to a content provider that requires a security certificate to consummate the communication. An individual application may go through the AMS 204 or certificate manager 208 to retrieve a particular certificate. If a particular certificate is not available, the AMS 204 or certificate manager 208 may notify the CD client 212 that a desired security certificate is not available on the mobile device 202.

The certificate manager 208 tracks which certificates are on the mobile device 202 and provides the certificates to other applications that request the certificate. The actual certificates may be stored in certificate data store 210.

The CD client 212 interfaces wirelessly with a certificate-distribution server, such as CD server 110. As described previously, the certificate-distribution server may be affiliated with the entity providing the radio-access network to which mobile device 202 is connected. The CD client 212 may generate a request for a new certificate and may receive instructions to modify or edit existing certificates in certificate data store 210. The CD client 212 may also periodically send status updates to a CD server. The status updates communicate the present status of certificates stored on the mobile device. Usage data related to the certificates may also be communicated. When the CD client 212 receives a new certificate, the new certificate may be passed to the certificate manager 208 and then into the certificate data store 210.

The CD client 212 may locally enforce rules related to the management of security certificates on the mobile device 202. Examples of certificate-management rules have been provided previously with reference to FIG. 1. The certificate-management rules may be enforced locally by the CD client 212 or another component on the mobile device 202, or by a network component such as a CD server. In one embodiment, both the CD client 212 and a CD server work together to enforce compliance with the certificate-management rules.

The certificate-distribution ("CD") interface 214 generates an interface that is displayed on the mobile device 202. The interface allows a user to view and change certificate-management rules. The CD interface 214 may also provide notifications and seek approval for new certificates to be stored on the mobile device. The CD interface 214 may provide an interface that allows the user to communicate with a CD server.

Figure 3:
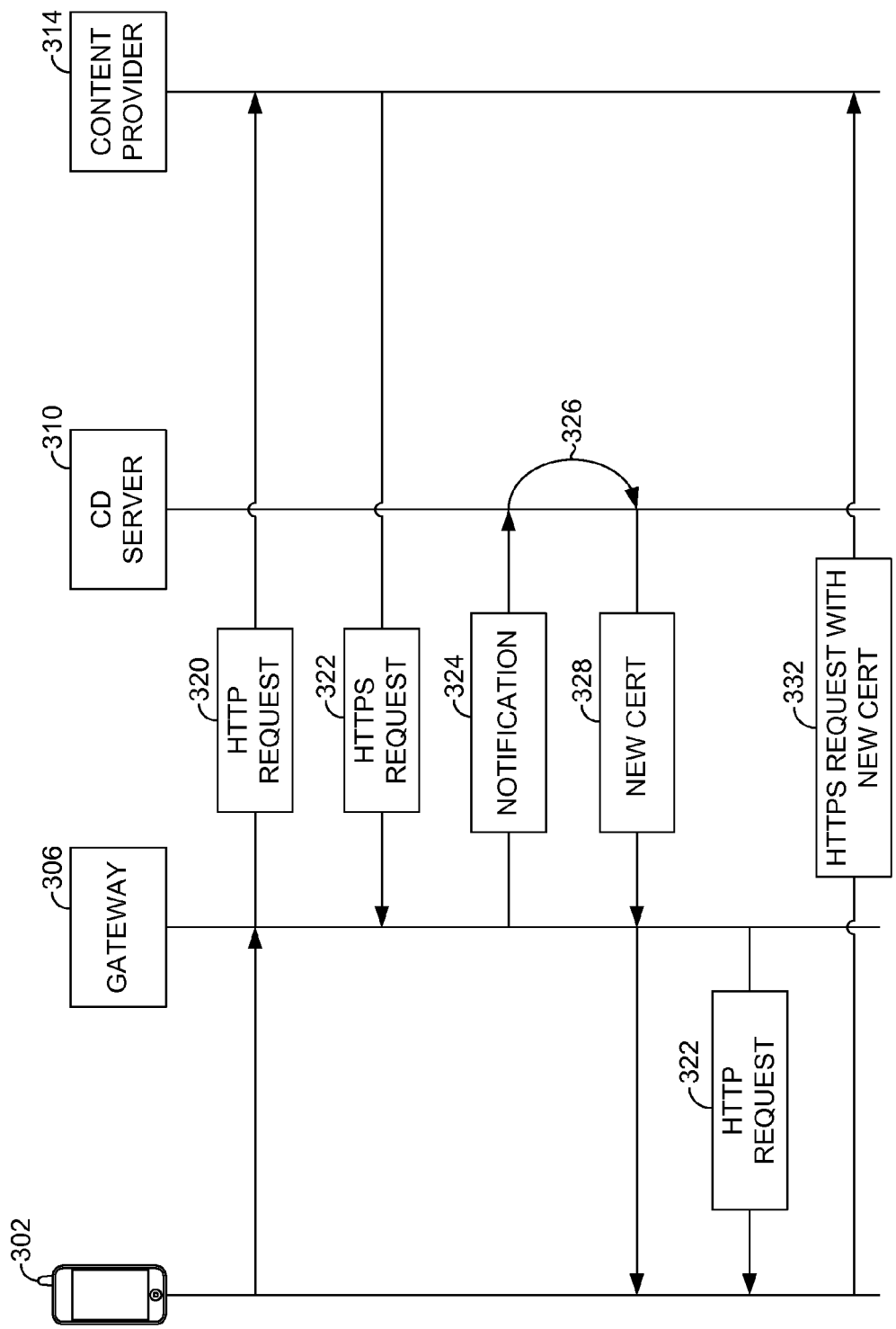
FIG. 3 is a diagram showing a portion of communications occurring during remote management of security certificates, in accordance with an embodiment of the present invention.

Turning now to FIG. 3, a figure showing a portion of communications occurring during remote management of security certificates is provided, in accordance with an embodiment of the present invention. The communications occur between a mobile device 302, a gateway 306, a CD server 310, and a content provider 314. The mobile device 302 may be similar to the mobile device 102 described previously with reference to FIG. 1. The gateway 306 may be similar to gateway 106 described previously with reference to FIG. 1. The certificate-distribution server 310 may be similar to the CD server 110 described previously with reference to FIG. 1. The content provider 314 may be similar to the content provider's server 114 described previously with reference to FIG. 1.

Initially an HTTP request 320 to establish a communication is sent from the mobile device 302 to the content provider's server 314. In this instance, the content provider 314 requires a certificate to be included with the communication request in order for the communication session to be initiated. The HTTP request 320 did not include the certificate. In response, the content provider 314 may send an HTTPS redirect 322 specifying the required certificate to the gateway 306. The HTTPS redirect 322 could be directed to the gateway by the content provider. In the alternative, the gateway 306 could determine the HTTPS redirect 322 is requesting a certificate that the mobile device 302 does not have and hold the HTTPS redirect 322 until a certificate is able to be provided.

The gateway 306 forwards the content of the HTTPS redirect 322 in notification 324 to the CD server 310. Upon receiving the notification 324, the CD server 310 determines whether the certificate can or should be sent to the mobile device 302. The certificate cannot be sent to the mobile device 302 if the CD server 310 does not have access to the certificate. In one embodiment, an entity controlling the radio-access network with which the CD server 310 is affiliated may monitor and approve each certificate that the CD server 310 has access to. Even if the CD server 310 has access to the certificate, the CD server 310 should not send the certificate to the mobile device 302 if sending the certificate to the mobile device would violate one or more certificate-management rules in place for the mobile device 302. Upon determining 326 that the mobile device can and should receive the requested certificate, the new certificate 328 is sent to the mobile device 302.

The new certificate 328 may be received by a CD client, similar to CD client 212 described previously. After the new certificate 328 is sent to the mobile device 302, the mobile device is able to respond to the HTTPS redirect. In one embodiment the request is delayed at the gateway 306 until a new certificate can be installed on the mobile device 302. Upon the installation of the new certificate, the delayed HTTPS redirect 322 is sent to the mobile device 302. The mobile device 302 may then generate a new HTTPS request 332 with the new certificate and send it to the content provider 314. Upon receiving the new HTTPS request 332 with the new certificate, the content provider 314 should authorize the communication session.

Figure 4:
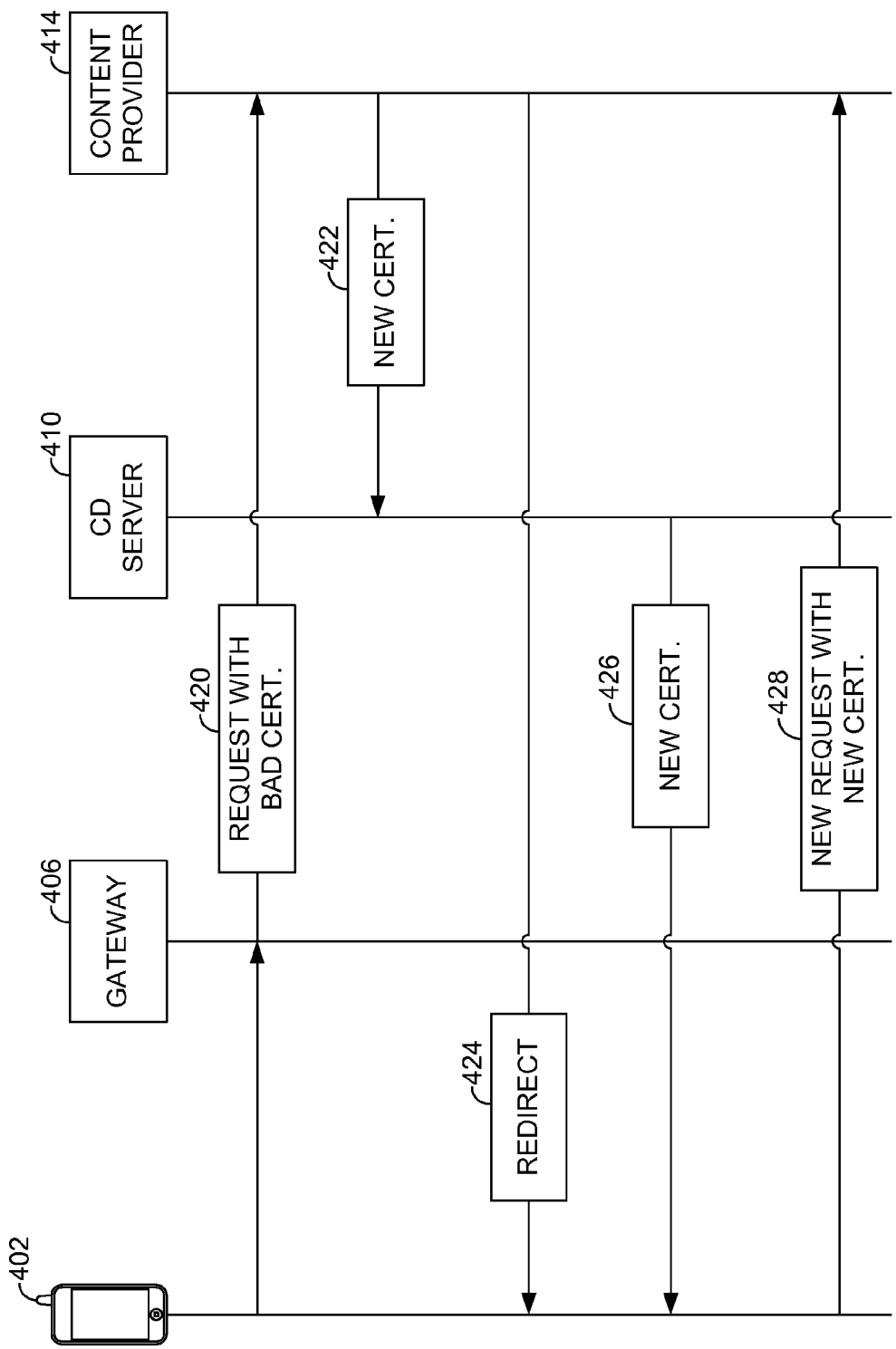
FIG. 4 is a diagram showing communications occurring during management of security certificates on a mobile device, in accordance with an embodiment of the present invention.

Turning now to FIG. 4, communications occurring during management of security certificates on a mobile device 402 are shown, in accordance with an embodiment of the present invention. The communications occur between a mobile device 402, a gateway 406, a CD server 410, and a content provider 414. The mobile device 402 may be similar to the mobile device 102 described previously with reference to FIG. 1. The gateway 406 may be similar to the gateway 106 described previously with reference to FIG. 1. The CD server 410 may be similar to the CD server 110 described previously with reference to FIG. 1. The content provider 414 may be similar to the content provider's server 114 described previously with reference to FIG. 1.

Initially, the mobile device 402 sends a request 420 with a bad certificate to the content provider 414. The certificate may be bad because it is not the certificate used by the content provider 414. The certificate may be a bad certificate because it is expired or is no longer in use by the content provider 414. Upon determining that a bad certificate has been provided, the content provider 414 may provide a new certificate 422 to the CD server 410, which the content provider 414 knows is affiliated with the mobile device 402. The content provider 414 may also send a redirect 424 to the mobile device 402 indicating that a bad certificate was sent. The redirect 424 may include information related to the correct certificate to use. The new certificate 422 may be sent from the content provider to the CD server 410. In another embodiment, the content provider 414 does not actually send the certificate to the CD server 410. Instead, the content provider 414 may just send information describing the correct certificate for the mobile device 402 to use when initiating a communication session with the content provider 414.

After determining that the new certificate is appropriate to send to the mobile device 402 based on certificate-management rules in place for the mobile device 402, the new certificate 426 is communicated from the CD server 410 to the mobile device 402. Once installed on the mobile device 402, the mobile device may send a new request with the new certificate 428 to the content provider 414. The content provider 414 may then authorize a communication session with the mobile device 402.

Turning now to FIG. 5, a method 500 for remotely managing security certificates on a mobile device is provided, in accordance with an embodiment of the present invention. The mobile device may be similar to the mobile device 102 described previously with reference to FIG. 1. The security certificates may be used to validate the identity of one or more endpoints in a communication session. The security certificates may also be used to encrypt communications occurring between endpoints during a communication session.

At step 510, a security certificate is received at the mobile device. The security certificate is received over a wireless interface on the mobile device. In one embodiment, the security certificate is received from a certificate-distribution server, such as CD server 110 described previously with reference to FIG. 1. The certificate may be sent to the mobile device in response to a request from the mobile device. In another embodiment, the security certificate is received after a separate entity determined that the security certificate was needed to initiate a communication session.

At step 520, the security certificate is stored in a data store located on the mobile device. The data store may store a plurality of security certificates. Some of the security certificates may be preinstalled on the mobile device prior to a sale of the mobile device to a user. Other security certificates in the data store may be installed as they are received over a wireless interface on the mobile device.

At step 530, a request to authenticate a communication session using the security certificate is received. In one embodiment, the request is an HTTPS request from a content provider. The request may identify the security certificate.

At step 540, a response to the request is communicated using the security certificate. The security certificate may be used to create the response by retrieving encryption algorithms from the security certificate. In some embodiments, the security certificate is transmitted along with the response.

In one embodiment, the security certificate is received and stored only after the mobile device determines that receipt and storage of the certificate conforms to one or more certificate-management rules in place for the mobile device. Depending on the certificate-management rules in place, the mobile device may display a notification that a certificate has been received. The mobile device may also display an interface asking the user to approve the receipt of the security certificate. In one embodiment, the certificate-management rules allow certificates to be received automatically without notification of or permission from the user.

Turning now to FIG. 6, a method 600 of managing security certificates on a plurality of mobile devices is provided, in accordance with an embodiment of the present invention. Method 600 may be performed by a certificate-distribution server, such as CD server 110 described previously with reference to FIG. 1. The security certificates may be used to validate the identity of one or more endpoints in a communication session. The security certificates may also be used to encrypt communications occurring between endpoints during a communication session.

At step 610, a request to communicate a security certificate to an individual mobile device within the plurality of mobile devices is received. The security certificate is not presently stored on the individual mobile device. In one embodiment, the request comes from the individual mobile device. In another embodiment, the request comes from a certificate authority that provided one or more security certificates to the mobile device. A certificate authority may want to update the set of certificates on the mobile device. In another embodiment, a content provider, such as a bank or e-commerce site, may request that a security certificate be sent to the mobile device.

In one embodiment, one or more certificate-management rules in place for the mobile device are consulted in response to receiving the request. If the requested certificate complies with the certificate-management rules in place, then the certificate may be retrieved from an available source. In one embodiment, the certificate is retrieved from a data store of approved certificates maintained by a telecommunications entity providing radio access to the mobile device. In another embodiment, the certificate is retrieved from a certificate authority or other source. At step 620, the security certificate is communicated to the mobile device over a wireless interface on the mobile device.

Figure 7:
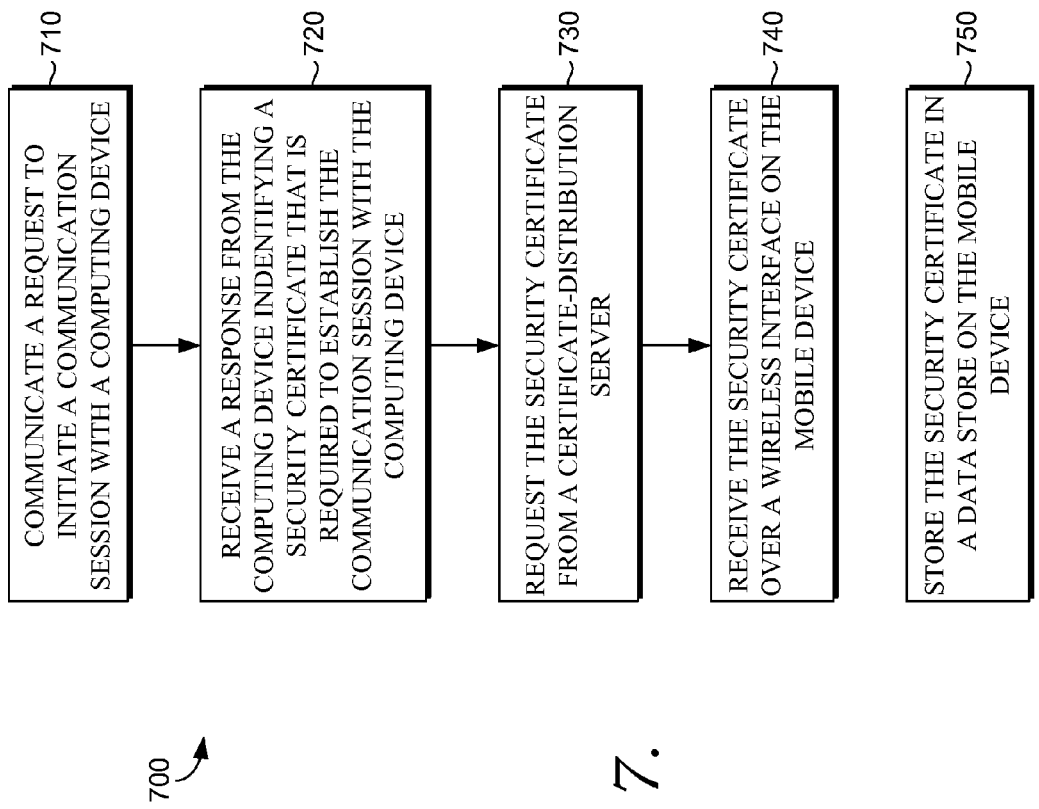
FIG. 7 is a flow chart illustrating a method of managing of security certificates on a mobile device, in accordance with an embodiment of the present invention.

Turning now to FIG. 7, a method 700 of managing security certificates on a mobile device is provided, in accordance with an embodiment of the present invention. The mobile device may be similar to the mobile device 102 described previously with reference to FIG. 1. The security certificates may be used to validate the identity of one or more endpoints in a communication session. The security certificates may also be used to encrypt communications occurring between endpoints during a communication session.

At step 710, a request to initiate a communication session with a computing device is communicated from the mobile device. The request may be an HTTP request or an HTTPS request. Other communication protocols may also be used.

At step 720, a response from the computing device identifying a security certificate that is required to establish the communication session with the computing device is received by the mobile device. Upon determining that the certificate is not presently stored on the mobile device, at step 730 the security certificate is requested from a certificate-distribution server. The certificate-distribution server may be similar to CD server 110 described previously with reference to FIG. 1. In one embodiment, an interface is provided to the user informing the user that a needed certificate is not present and seeking permission to request the new certificate.

At step 740, the security certificate is received over a wireless interface on the mobile device. At step 750, the security certificate is stored in a data store on the mobile device. The security certificate may then be used to formulate a response to the computing device's request for the security certificate. The certificate may be used to encrypt or validate communications between the mobile device and the computing device. In one embodiment, the computing device is a content provider such as a bank, brokerage, or e-commerce site.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for remotely managing security certificates on a mobile device that subscribes to a telecommunications provider, the method comprising:
   at the mobile device, communicating with a certificate distribution server that is maintained by the telecommunications provider to which the mobile device subscribes;
   receiving, at the mobile device, a security certificate from the certificate distribution server, wherein the security certificate is received over a wireless interface on the mobile device by way of a radio access network that is controlled by the telecommunications provider, and wherein the security certificate is associated with a content provider;
   storing the security certificate in a data store located on the mobile device;
   receiving a request to authenticate a communication session using the security certificate;
   communicating to a source of the request a response to the request using the security certificate; and
   determining that storing the security certificate conforms to certificate-management rules in place for the mobile device that are customized by a user, wherein the certificate-management rules specify at least authorized certificate authorities, and
   wherein the authorized certificate authorities are particular authorities from which new certificates are allowed to be received.

2. The method of claim 1, wherein the method further comprises displaying an interface on a display associated with the mobile device requesting permission to receive the security certificate.

3. The method of claim 1, wherein the method further comprises:
   receiving a message from the content provider indicating the security certificate is needed to establish the requested communication session; and
   communicating a request for the security certificate to a certificate-distribution server.

4. The method of claim 3, wherein the security certificate is received from the certificate-distribution server.

5. The method of claim 1, wherein the method further includes displaying an interface of the mobile device through which certificate-management policies may be edited.

6. The method of claim 5, wherein the certificate-management policies comprise enabling auto installation without user notification.

7. One or more non-transitory computer-readable media having computer-executable instructions embodied thereon that when executed by a computing device perform a method of managing security certificates on a plurality of mobile devices that subscribe to a telecommunications provider, the method comprising:
   at a network device controlled by the telecommunications provider, storing user-provided certificate-management rules associated with each of the mobile devices that subscribe to the telecommunications provider;
   at the network device, receiving a request to communicate a security certificate to an individual mobile device within the plurality of mobile devices, wherein the security certificate is not presently stored on the individual mobile device, and wherein the security certificate is associated with a content provider; and
   at the network device, accessing the user-provided certificate-management rules associated with the individual mobile device;
   prior to communicating the security certificate to the individual mobile device, determining that communicating the security certificate to the individual mobile device conforms to the user-provided certificate-management rules associated with the individual mobile device, wherein the certificate-management rules specify at least authorized certificate authorities, and wherein the authorized certificate authorities are particular authorities from which new certificates are allowed to be received;
   based on the determination, communicating the security certificate to the individual mobile device over a wireless interface;
   at the network device, monitoring data related to the security certificate, the monitored data including usage information.

8. The media of claim 7, wherein the request is received from the content provider.

9. The media of claim 7, wherein the request is received from the individual mobile device indicating that the security certificate is required to initiate a communication session with the content provider.

10. The media of claim 7, wherein the method further comprises retrieving the security certificate from the certificate authority.

11. The media of claim 7, wherein the method further comprises, at the network device:
   making a record of each security certificate on each of the plurality of mobile devices;
   monitoring an expiration date associated with said each security certificate; and
   editing a specific security certificate on each of the plurality of mobile devices in response to determining the specific security certificate on each of the plurality of mobile devices has expired.

12. The media of claim 7, further comprising receiving an indication that a particular security certificate on one or more of the plurality of mobile devices has been compromised and communicating an instruction to each of the one or more of the plurality of mobile devices to delete the particular security certificate.

13. One or more non-transitory computer-readable media having computer-executable instructions embodied thereon that when executed by a computing device perform a method of managing security certificates on a mobile device that subscribes to a telecommunications provider, the method comprising:
   communicating, from the mobile device, a request to initiate a communication session with a computing device associated with a content provider, wherein the mobile device communicates by way of a radio-access network controlled by the telecommunications provider;
   receiving a response from the computing device identifying a security certificate that is required to establish the communication session with the computing device;
   requesting the security certificate from a certificate-distribution server that is maintained by the telecommunications provider and that manages security certificates for mobile devices that subscribe to the telecommunications provider;
   receiving the security certificate over a wireless interface on the mobile device, wherein the certificate is received from the certificate-distribution server;

determining that storing the security certificate conforms to certificate-management rules in place for the mobile device that are customized by a user of the mobile device, wherein the certificate-management rules specify at least authorized certificate authorities, and wherein the authorized certificate authorities are particular authorities from which new certificates are allowed to be received;

storing the security certificate in a data store on the mobile device; and monitoring data related to the security certificate, the monitored data including usage information.

14. The media of claim 13, wherein the method further comprises determining that receiving the security certificate does not violate the certificate-management rules in place for the mobile device.

15. The media of claim 13, wherein the response is an HTTPS redirect.

16. The media of claim 13, wherein the method further comprises displaying an interface on the mobile device requesting permission to receive the security certificate and receiving an input indicating that permission is granted.

17. The media of claim 13, wherein the method further comprises displaying an interface on the mobile device that displays present certificate-management-rule settings and allows a user to update the settings.

\* \* \* \* \*